United States Patent
Fukuda et al.

(10) Patent No.: US 8,455,034 B2
(45) Date of Patent: Jun. 4, 2013

(54) GREEN TEA DRINK PACKED IN CONTAINER

(75) Inventors: Masahiro Fukuda, Sumida-ku (JP); Hirokazu Takahashi, Sumida-ku (JP); Ryo Kusaka, Sumida-ku (JP); Eri Itaya, Sumida-ku (JP)

(73) Assignee: Kao Corporation, Tokyo (JP)

( * ) Notice: Subject to any disclaimer, the term of this patent is extended or adjusted under 35 U.S.C. 154(b) by 382 days.

(21) Appl. No.: 12/519,999

(22) PCT Filed: Dec. 22, 2006

(86) PCT No.: PCT/JP2006/325621
§ 371 (c)(1), (2), (4) Date: Jun. 18, 2009

(87) PCT Pub. No.: WO2008/078359
PCT Pub. Date: Jul. 3, 2008

(65) Prior Publication Data
US 2009/0311383 A1    Dec. 17, 2009

(51) Int. Cl.
*A23F 3/00*    (2006.01)

(52) U.S. Cl.
USPC ............................. 426/597; 426/72; 426/569

(58) Field of Classification Search
USPC ............................................. 426/72, 597, 569
See application file for complete search history.

(56) References Cited

U.S. PATENT DOCUMENTS

| | | | | |
|---|---|---|---|---|
| 4,946,701 | A * | 8/1990 | Tsai et al. | 426/597 |
| 7,056,547 | B2 * | 6/2006 | Ogura et al. | 426/597 |
| 7,232,585 | B2 * | 6/2007 | Quan et al. | 426/597 |
| 2006/0099318 | A1 | 5/2006 | Iwasaki et al. | |
| 2007/0128327 | A1 * | 6/2007 | Takashima et al. | 426/597 |
| 2009/0191311 | A1 * | 7/2009 | Fukuda et al. | 426/72 |

FOREIGN PATENT DOCUMENTS

| | | |
|---|---|---|
| CN | 1771823 A | 5/2006 |
| JP | 60-156614 | 8/1985 |
| JP | 3-133928 | 6/1991 |
| JP | 8-109178 | 4/1996 |
| JP | 8-298930 | 11/1996 |
| JP | 2002-142677 | 5/2002 |
| JP | 2002 326932 | 11/2002 |
| JP | 2003 333989 | 11/2003 |
| JP | 2004 41186 | 2/2004 |
| JP | 2006 129738 | 5/2006 |
| WO | WO 2008/004339 A1 | 1/2008 |
| WO | WO 2008/059609 A1 | 5/2008 |

OTHER PUBLICATIONS

English Translation for JP 2004-041186 published Feb. 2004.*
English Translation for JP 2002-326932, published Nov. 2002.*
Chinese Office Action issued Jan. 26, 2011, in Patent Application No. 200680056714.8 (with English-language translation).
Extended Search Report issued Jan. 16, 2012 in European Patent Application No. 06843078.4-1221.
Chinese Office Action mailed Dec. 28, 2012 in Chinese Patent Application No. 200680056714.8, with English Translation, 9 pp.

* cited by examiner

*Primary Examiner* — Anthony Weier
(74) *Attorney, Agent, or Firm* — Oblon, Spivak, McClelland, Maier & Neustadt, L.L.P.

(57) ABSTRACT

A packaged green tea beverage, wherein
(A) the packaged green tea beverage contains from 0.08 to 0.5 wt % of non-polymer catechins,
(B) a percentage of non-epicatechin body in the non-polymer catechins is from 5 to 25 wt %,
(C) a percentage of gallate body in the non-polymer catechins is from 5 to 95 wt %,
(D) pH is from 2.5 to 5.1, and
(F) the packaged green tea beverage contains from 0.0001 to 20 wt % of at least one sweetener selected from fructose, glucose, sucrose, fructoglucose syrup and glucofructose syrup.

A packaged green tea beverage containing non-polymer catechins in high concentration can be provided, which can not only reduce astringency but also provides for adequate sweetness and sourness without impairment of the taste and is suited for long-term storage while containing a sweetener.

14 Claims, No Drawings

GREEN TEA DRINK PACKED IN CONTAINER

FIELD OF THE INVENTION

The present invention relates to a packaged green tea beverage containing catechins in high concentration, which can not only reduce astringency but also provides for adequate sweetness and sourness, and is suited for long-term storage while containing a sweetener.

BACKGROUND OF THE INVENTION

Catechins are reported to have a suppressing effect on the increase of cholesterol and an inhibitory effect on α-amylase activity (see, for example, Patent Document 1 and Patent Document 2). For such physiological effects to materialize, it is necessary for an adult to drink 4 to 5 cups of tea a day. Therefore, there has been a demand for a technology that can make a beverage contain catechins in high concentration, so that a large amount of catechins can be consumed with ease. As one of such examples, there is a method that is designed to incorporate catechins into a beverage in a dissolved form by using a concentrate of green tea extract or the like (see, for example, Patent Documents 3 to 5).

However, if used in the raw, commercially available concentrates of green tea extract result in strong astringency and bitterness attributable to the components contained in such concentrates of green tea extract and cause a poor feeling when running down through the throat. From the standpoint of applicability for long-term drinking that is needed for the physiological effects of catechins to arise, there has been a demand for a beverage that can be stable over a long period of time and satisfies both of the requirement for adequate sweetness and sourness and the requirement for reducing the astringency originated from catechins characteristic of a beverage with a high concentration of catechins, whatever its technique.

[Patent Document] JP-A-60-156614
[Patent Document] JP-A-03-133928
[Patent Document] JP-A-2002-142677
[Patent Document] JP-A-08-298930
[Patent Document] JP-A-08-109178

DISCLOSURE OF THE INVENTION

The present invention provides a packaged green tea beverage, wherein
(A) the packaged green tea beverage contains from 0.08 to 0.5 wt % of non-polymer catechins;
(B) a percentage of non-epicatechin body in the non-polymer catechins is from 5 to 25 wt %;
(C) a percentage of gallate body in the non-polymer catechins is from 5 to 95 wt %;
(D) pH is from 2.5 to 5.1; and
(F) the packaged green tea beverage contains from 0.0001 to 20 wt % of one or more sweeteners selected from fructose, glucose, sucrose, fructoglucose syrup and glucofructose syrup.

EMBODIMENTS OF THE INVENTION

The present invention provides a packaged green tea beverage containing catechins in high concentration, which satisfies not only reduced astringency but also adequate sweetness and sourness, and allows for less reduction of the catechin content even when stored over a long period of time.

The present inventors studied the improvement of the taste of packaged green tea beverages containing catechins in high concentration. Thus it has been found that, by controlling the percentage of non-epicatechin body in non-polymer catechins, and by adjusting pH, the reduction of catechin content gets less and less even when stored over a long period of time, and further that, if bitterness is reduced by controlling the percentage of gallate body in the non-polymer catechins, and a sweetener and a sour seasoning are used as well, then it becomes possible to obtain a packaged green tea beverage having both of adequate sweetness and adequate sourness.

By controlling the percentage of non-epicatechin body in the non-polymer catechins, and by adjusting the percentage of gallate body in the non-polymer catechins and the pH, the packaged green tea beverage according to the present invention has both of reduced astringency and adequate sweetness and sourness and allows for less reduction of the catechin content while containing a sweetner even when stored over a long period of time.

The term "non-polymer catechins (A)" as used herein is a generic term, which collectively encompasses non-epicatechins such as catechin, gallocatechin, catechin gallate and gallocatechin gallate, and epicatechins such as epicatechin, epigallocatechin, epicatechin gallate and epigallocatechin gallate. The concentration of non-polymer catechins is defined in terms of the total amount of the eight non-polymer catechins described above.

The packaged green tea beverage according to the present invention contains non-polymer catechins, in a form dissolved in water, at a content of from 0.08 to 0.5 wt %, preferably from 0.09 to 0.4 wt %, more preferably from 0.1 to 0.3 wt %, even more preferably from 0.11 to 0.2 wt %. Insofar as non-polymer catechins fall within this range, a great deal of non-polymer catechins can be readily ingested so that the physiological effects of non-polymer catechins can be expected. A content of non-polymer catechins lower than 0.08 wt % cannot bring about sufficient physiological effects, while a content of non-polymer catechins higher than 0.5 wt % provides the beverage with increased bitterness.

The non-polymer catechins in the packaged green tea beverage according to the present invention include epicatechins consisting of epigallocatechin gallate, epigallocatechin, epicatechin gallate and epicatechin; and non-epicatechins consisting of catechin gallate, gallocatechin gallate, gallocatechin and catechin. Then on-epicatechins are little found in natural, and are formed by thermal denaturation of the epicatechins. Further, the non-polymer catechins change into polymer catechins by thermal denaturation. The percentage ([(B)/(A)]×100) of (B) the non-epicatechins in the non-polymer catechins in (A) the non-polymer catechins is from 5 to 25 wt %, preferably from 8 to 20 wt %, more preferably from 10 to 15 wt % from the viewpoints of taste and the storage stability of the non-polymer catechins.

The non-polymer catechins in the packaged green tea beverage according to the present invention include gallates consisting of epigallocatechin gallate, gallocatechin gallate, epicatechin gallate and catechin gallate; and non-gallates consisting of epigallocatechin, gallocatechin, epicatechin and catechin. Because the gallates as ester-type non-polymer catechins are strong in bitterness, the percentage of (C) gallate body in (A) the non-polymer catechins (i.e., ([(C)/(A)]× 100) usable in the packaged green tea beverage according to the present invention is from 5 to 95 wt %, preferably from 8 to 55 wt %, more preferably from 10 to 51 wt % from the viewpoint of the suppression of bitterness.

As green tea for use in the packaged green tea beverage according to the present invention, there can be mentioned green tea manufactured from tea leaves obtained from the Genus *Camellia*, for example, *C. sinensis, C. assamica*, the Yabukita variety, or a hybrid thereof by inactivating enzyme activity (through killing step).

As a method for obtaining a green tea extract, a conventional method such as stirred extraction can be performed. Upon extraction, an organic acid or organic acid salt, such as sodium ascorbate, may be added beforehand to water. The temperature of the water upon extraction from green tea leaves may be preferably from 70 to 100 (boiling water)° C., more preferably from 80 to 100 (boil ing water)° C. from the viewpoint of taste. The amount of the water upon extraction from the green tea leaves may be preferably from 5 to 60 times, more preferably from 5 to 40 times as much as the weight of the green tea leaves. The extraction time from the green tea leaves may be preferably from 1 to 60 minutes, more preferably from 1 to 40 minutes, even more preferably from 1 to 30 minutes. Under these conditions for obtaining the green tea extract, the extracted amounts of the non-polymer catechins and caffeine are not affected much, and it is preferred to choose extraction conditions from the viewpoint of taste. A liquid or powdery concentrate of the green tea extract is also usable.

The package green tea beverage containing non-polymer catechins in high concentration in the present invention can be obtained, for example, by mixing a concentrate of a green tea extract to adjust the concentration of non-polymer catechins. Specifically, an aqueous solution of a concentrate of a green tea extract or one obtained by mixing a green tea extract to the concentrate of the green tea extract can be mentioned. The term "a concentrate of a green tea extract" as used herein means one obtained by removing a portion of water from a solution extracted from green tea leaves with hot water or a water-soluble organic solvent or one obtained with an increased concentration of non-polymer catechins by purifying the solution, and as its forms, various forms such as a solid, aqueous solution and slurry can be mentioned. Further, the term "a tea concentrate available from tea leaves" means an extract not subjected to any concentration or purification operation.

As aqueous solutions of purified products of green tea extracts containing non-polymer catechins, those obtained by dissolving commercially-available "POLYPHENON" (Mitsui Norin Co., Ltd.), "TEAFURAN (ITO EN, LTD.), "SUNPHENON" (Taiyo Kagaku Co., Ltd.) and the like can be mentioned. Those obtained by purifying such commercial products may also be used insofar as the concentrations of non-polymer catechins fall within the above-described range. As a purification method, there is, for example, a method that suspends a purified product of a green tea extract in water or a mixture of water and an organic solvent such as ethanol, removes the resulting precipitate, and then distill away the solvent. As an alternative, one obtained by further purifying a concentrate of an extract obtained from tea leaves with hot water or a water-soluble organic solvent such as ethanol or one obtained by directly purifying the extract may also be used. If the content of non-polymer catechins in an aqueous solution of the purified product of the green tea extract is lower than 0.8 wt %, the content of non-polymer catechins in the final packaged green tea beverage after heat sterilization is not sufficient. A concentration higher than 50 wt %, on the other hand, leads to a high viscosity and requires long time for dissolution. The preferred concentration of non-polymer catechins in the aqueous solution of the purified product of the green tea extract is from 0.9 to 30 wt %, more preferably from 1.0 to 20 wt %.

The non-polymer catechins for use in the present invention can be lowered in the percentage of gallate body by subjecting the green tea extract or its purified product to tannase treatment. Upon conducting this treatment with tannase, tannase may preferably be added such that its amount falls within a range of from 0.5 to 10 wt % relative to the non-polymer catechins in the green tea extract. The temperature of the tannase treatment may be preferably from 15 to 40° C. at which its enzyme activity is available, with from 20 to 30° C. being more preferred. At the time of the tannase treatment, the pH may be preferably from 4 to 6 at which its enzyme activity is available, with from 4.5 to 6 being more preferred and from 5 to 6 being even more preferred.

The content weight ratio ((F)/(A)) of the non-polymer catechins (A) to the caffeine (F) in the packaged green tea beverage according to the present invention may be preferably from 0.0001 to 0.16, more preferably from 0.001 to 0.15, even more preferably from 0.01 to 0.14, even more preferably from 0.05 to 0.13. An excessively low ratio of caffeine to non-polymer catechins is not preferred from the standpoint of taste balance. An excessive high ratio of caffeine to non-polymer catechins is not preferred because the inherent external appearance of the beverage is impaired, either. The caffeine (F) can be the caffeine naturally found in a green tea extract, flavor, fruit extract and any other ingredient(s) employed as ingredients, or can be caffeine added newly.

In the packaged green tea beverage according to the present invention, the pH (D) is in the range of from 2.5 to 5.1, preferably from 2.8 to 5.0, more preferably from 3.0 to 4.5, even more preferably from 3.8 to 4.2. A pH lower than 2.5 results in stronger sourness so that non-polymer catechins decrease during long-term storage. A pH higher than 5.1, on the other hand, causes non-polymer catechins to decrease during long-term storage through a reaction or the like with a carbohydrate used in combination. The pH can be adjusted with ascorbic acid or its salt, citric acid or the like to the above-describe range. By this pH adjustment, a beverage permitting long-term storage and having adequate sourness is obtained.

The packaged green tea beverage according to the present invention contains (E) at least one sweetener selected from fructose, glucose, sucrose and fructose-glucose syrups. These sweeteners are contained at from 0.0001 to 20 wt %, preferably at from 0.001 to 15 wt %, more preferably at from 0.01 to 10 wt % in the packaged green tea beverage according to the present invention.

If the sweetener is too little, the packaged green tea beverage according to the present invention has substantially no sweetness so that its sweetness is not balanced with its sourness or saltiness. Therefore, the degree of its sweetness may preferably be at least 2 when sucrose is assumed to have a sweetness degree of 1 (References: JIS Z8144, Sensory Assessment Analysis-Terms, No. 3011, Sweetness; JIS Z9080, Sensory Assessment Analysis-Methods, Testing Method; Beverage Term Dictionary, 4-2 Classification of Sweetness Degrees, Material 11 (Beverage Japan, Inc.); Property Grading Test mAG Test, ISO 6564-1985(E), "Sensory Analysis—Methodology—Flavour profile method", etc.) A sweetness degree of 8 or higher, on the other hand, may be too sweet, and may give a strong feeling of being caught in the throat and an impaired feeling as the beverage goes down the throat. It is to be noted that these sweeteners include those contained in the tea extract.

The content of glucose in the packaged green tea beverage according to the present invention may be preferably from 0.0001 to 20 wt %, more preferably from 0.001 to 15 wt %, even more preferably from 0.01 to 10 wt %. The content of fructose in the packaged green tea beverage according to the present invention may be preferably from 0.0001 to 20 wt %, more preferably from 0.001 to 15 wt %, even more preferably from 0.01 to 10 wt %. The fructoglucose syrup and glucofructose syrup are syrups of their mixtures, and their contents may be preferably from 0.01 to 7 wt %, more preferably from 0.1 to 6 wt %, even more preferably from 1.0 to 5 wt %. These sweeteners cause coloration due to Maillard reaction during storage of the beverage if mixed in a total amount of 20 wt % or more.

As forms of sucrose, there are granulated sugar, liquid sugar, white superior soft sugar, etc. They are all usable. The content of sucrose in the packaged green tea beverage according to the present invention may be preferably from 0.001 to 20 wt %, more preferably from 0.01 to 15 wt %, even more preferably from 0.1 to 10 wt %.

In the packaged green tea beverage according to the present invention, glycerols, complex polysaccharides, sugar alcohols, artificial sweeteners and the like can also be used in addition to the above-described sweeteners. A glycerol can be used, for example, at from 0.1 to 15 wt %, preferably at from 0.1 to 10 wt % in the packaged green tea beverage according to the present invention.

As the sugar alcohols in the sweeteners usable in the packaged green tea beverage according to the present invention, erythritol, sorbitol, xylitol, trehalose, maltitol, lactitol, palatinose, mannitol and the like can be mentioned. Among these, erythritol is preferred as it has no calorific value and is highest in maximum non-effect intake. The content of such a sugar alcohol may preferably be from 0.0001 to 20 wt %.

The amount of carbohydrates usable in the packaged green tea beverage according to the present invention may be preferably from 0.0001 to 20 wt % based on the total weight. The total amount of carbohydrates includes those contained in a fruit juice or tea extract.

Artificial sweetener usable in the packaged green tea beverage according to the present invention include high-sweetness sweeteners such as aspartame, sucralose, saccharin, cyclamate, acesulfame-K, L-aspartyl-L-phenylalanine lower alkyl ester, L-aspartyl-D-alanine amide, L-aspartyl-D-serine amide, L-aspartyl-hydroxymethylalkanamide, L-aspartyl-1-hydroxyethylalkanamide and sucralose, glycyrrhizin, synthetic alkoxyaromatic compounds, and the like. The content of such an artificial sweetener may be preferably from 0.0001 to 20 wt %. Thaumatin, stevioside and other natural-source sweeteners are also usable.

In the packaged green tea beverage according to the present invention, a sour seasoning can be used. A low concentration of the sour seasoning results in unduly weak sourness although bitterness and astringency can be suppressed. A high concentration of the sour seasoning, on the other hand, leads not only to stronger sourness but also to stronger bitterness and astringency. The sour seasoning in the present invention can be at least one sour seasoning selected from ascorbic acid, citric acid, gluconic acid, succinic acid, tartaric acid, lactic acid, fumaric acid, phosphoric acid, malic acid, and salts thereof. To obtain adequate sourness, it is preferred to use such an acid and its salt in combination although the single use of the acid can still provide a pH suitable for long-term storage. Specifically, trisodium citrate, monopotassium citrate, tripotassium citrate, sodium gluconate, potassium gluconate, sodium tartrate, trisodium tartrate, potassium hydrogen tartrate, sodium lactate, potassium lactate, sodium fumarate and the like can be mentioned.

Other sour seasonings include adipic acid and fruit extracts extracted from natural sources. These sour seasonings may be contained preferably at from 0.01 to 0.5 wt %, more preferably at from 0.02 to 0.3 wt % in the packaged green tea beverage according to the present invention. Further, inorganic acids and inorganic acid salts can also be used. These inorganic acids and inorganic acid salts include diammonium hydrogenphosphate, ammonium dihydrogenphosphate, dipotassium hydrogenphosphate, disodium hydrogenphosphate, sodium dihydrogenphosphate, trisodium metaphosphate, tripotassium phosphate, and the like. These inorganic acids and inorganic acid salts may be contained preferably at from 0.01 to 0.5 wt %, more preferably at from 0.02 to 0.3 wt % in the packaged green tea beverage according to the present invention.

It is possible to mix one or more of flavorings (flavors) and fruit extracts (fruit juices) to the packaged green tea beverage according to the present invention with a view to improving its taste. Natural or synthetic flavorings and fruit extracts can be used. They can be selected from fruit juices, fruit flavors, plant flavors, and mixtures thereof. For example, a combination of a fruit juice with a tea flavor, preferably a green tea or black tea flavor has an attractive taste. Usable fruit extracts include apple, pear, lemon, lime, mandarin, grapefruit, cranberry, orange, strawberry, grape, kiwi, pineapple, passion fruit, mango, guava, raspberry, and cherry juices. More preferred are citrus juices, grapefruit, orange, lemon, lime and mandarin, mango juice, passion fruit juice, guava juice, and mixtures thereof. Such a fruit extract may be contained preferably at from 0.001 to 20 wt %, more preferably at from 0.002 to 10 wt % in the beverage according to the present invention. Preferred natural flavors include jasmine, chamomile, rose, peppermint, *Crataegus cuneata*, chrysanthemum, water caltrop, sugarcane, bracket fungus of the genus *Fomes* (*Fomes japonicus*), bamboo shoot, and the like. Even more preferred flavorings are citrus flavors including orange flavor, lemon flavor, lime flavor and grapefruit flavor. In addition to such citrus flavors, various other fruit flavors such as apple flavor, grape flavor, raspberry flavor, cranberry flavor, cherry flavor and pineapple flavor are also usable. These flavors can be derived from natural sources such as fruit extracts and balms, or can be synthesized. The term "flavoring" as used herein can also include blends of various flavors, for example, a blend of lemon and lime flavors and blends of citrus flavors and selected spices (typically, cola and soft drink flavors). Such a flavoring can be mixed preferably at from 0.0001 to 5 wt %, more preferably at from 0.001 to 3 wt % to the beverage according to the present invention.

In the packaged green tea beverage according to the present invention, one or more vitamins can be incorporated further. Preferably, vitamin A, vitamin B and vitamin E can be added. Other vitamins such as vitamin D may also be added. Vitamin B includes a vitamin B complex selected from inositol, thiamine hydrochloride, thiamine nitrate, riboflavin, riboflavin 5'-phosphate sodium, niacin, nicotinamide, calcium pantothenate, pyridoxy hydrochloride and cyanocobalamin, and folic acid and/or biotin can also be used in the beverage according to the present invention. These vitamins can each be added preferably in an amount of at least 10 wt % of its daily requirement (U.S. RDI Standards, described in US2005/0003068: U.S. Reference Intake) per package.

Minerals can also be incorporated in the packaged green tea beverage according to the present invention. Preferred minerals are calcium, chromium, copper, fluorine, iodine, iron, magnesium, manganese, phosphorus, selenium, silicon, molybdenum, and zinc. More preferred minerals are magnesium, phosphorus and iron.

In the packaged green tea beverage according to the present invention, a cyclodextrin can also be used in combination to suppress the bitterness of non-polymer catechins. The cyclodextrin can be an α-cyclodextrin, a β-cyclodextrin or a γ-cyclodextrin. Such a cyclodextrin may be added preferably at from 0.005 to 0.5 wt %, more preferably at from 0.02 to 0.3 wt %, even more preferably at from 0.05 to 0.25 wt % in the packaged green tea beverage according to the present invention.

In the packaged green tea beverage according to the present invention, sodium and potassium can also be incorporated. The total concentration of sodium and potassium may preferably be from 0.001 to 0.5 wt %. A total concentration lower than 0.001 wt % tends to leave an unfulfilled feeling in taste depending on the situation of drinking. A total concentration higher than 0.5 wt %, on the other hand, leads to a strong taste of the salts themselves and results in a tendency undesired for long-term drinking.

In the packaged green tea beverage according to the present invention, one or more of readily-available sodium salts such as sodium ascorbate, sodium chloride, sodium carbonate, sodium hydrogencarbonate, sodium citrate, sodium phosphate, sodium hydrogenphosphate, sodium tartrate, sodium benzoate, the like, and mixtures thereof may be mixed as sodium. The sodium includes that originated from an added fruit extract or that contained as an ingredient in tea. The higher the concentration of sodium, the higher the degree of discoloration of the beverage. From the viewpoint of physiological effects and stability, the content of sodium in the packaged green tea beverage according to the present invention may be preferably from 0.001 to 0.5 wt %, more preferably from 0.002 to 0.4 wt %, even more preferably from 0.003 to 0.2 wt %.

In the packaged green tea beverage according to the present invention, one or more of potassium salts such as potassium chloride, potassium carbonate, potassium sulfate, potassium acetate, potassium hydrogencarbonate, potassium citrate, potassium phosphate, potassium hydrogenphosphate, potassium tartrate, potassium solbate, the like, and mixtures thereof may be mixed as potassium. The potassium includes that originated from an added fruit extract or that contained as an ingredient in tea. The concentration of potassium affects more the color tone during long-term high-temperature storage than the concentration of sodium. From the viewpoint of stability, the content of potassium in the packaged green tea beverage according to the present invention may be preferably from 0.001 to 0.2 wt %, more preferably from 0.002 to 0.15 wt %, even more preferably from 0.003 to 0.12 wt %.

In the packaged green tea beverage according to the present invention, additives such as antioxidants, flavorings, various esters, organic acids, organic acid salts, inorganic salts, colors, emulsifiers, preservatives, seasoning agents, vegetable extracts, flower honey extracts, pH regulators and quality stabilizers may be mixed either singly or in combination, in addition to the ingredients originated from tea, as described above.

The packaged green tea beverage according to the present invention can be formulated into a non-carbonate beverage depending on the preference. It can also be formulated into a carbonated beverage. The provision of adequate bubbling property by carbon dioxide gas makes it possible to suppress the bitterness of non-polymer catechins, and further, to give a soft feeling and a pleasant cooling over an extended time.

The calorific value of the packaged green tea beverage according to the present invention can be calculated based on 4 kcal/g for glucose, fructose and sucrose and 0 Kcal/g for erythritol contained in 100 mL of the beverage. The packaged green tea beverage according to the present invention may preferably have a low calorific value of not greater than 40 kcal/240 mL, with not greater from 2 to 35 kcal/240 mL being more preferred, and not greater than from 3 to 30 kcal/240 mL being even more preferred.

As a package usable for the packaged green tea beverage according to the present invention, a package of a conventional form, such as a molded package made of polyethylene terephthalate as a principal component (a so-called PET bottle), a metal can, a paper package combined with metal foils or plastic films, a bottle or the like, can be provided as for general beverages. The term "packaged green tea beverage" as used herein means one that can be taken without dilution.

The packaged green tea beverage according to the present invention can be produced, for example, by filling the beverage in a package such as a metal can and, when heat sterilization is feasible, conducting heat sterilization under sterilization conditions prescribed in relevant regulations (in Japan, the Food Sanitation Act). For those which cannot be subjected to retort sterilization like PET bottles or paper packages, a process is adopted such that the beverage is sterilized beforehand at a high temperature for a short time under similar sterilization conditions as those described above, for example, by a plate-type heat exchanger or the like, is cooled to a particular temperature, and is then filled in a package. Under aseptic conditions, additional ingredients may be mixed to and filled in a beverage-filled package. It is also possible to conduct an operation such that subsequent to heat sterilization under acidic conditions, the pH of the beverage is caused to rise back to neutral under aseptic conditions or that subsequent to heat sterilization under neutral conditions, the pH of the beverage is caused to drop back to the acidic side under aseptic conditions.

EXAMPLES

Measurements of Non-Polymer Catechins and Caffeine

A high-performance liquid chromatograph (model: "SCL-10AVP") manufactured by Shimadzu Corporation was used. The chromatograph was fitted with a liquid chromatograph column packed with octadecyl-introduced silica gel, "L-Column, TM ODS" (4.6 mm in diameter×250 mm; product of Chemicals Evaluation and Research Institute, Japan). A sample, which had been subjected to filtration through a membrane filter (0.8 μm) and then to dilution with distilled water, was measured at a column temperature of 35° C. by the gradient elution method. A mobile phase, Solution A, was a solution containing acetic acid at 0.1 mol/L in distilled water, while another mobile phase, Solution B, was a solution containing acetic acid at 0.1 mol/L in acetonitrile. The measurement was conducted under the conditions of 20 μL sample injection volume and 280 nm UV detector wavelength (the concentrations of catechins and caffeine are generally expressed in terms of weight/volume % (% [w/v]), but their contents in each Example will be expressed in terms of weight by multiplying their concentrations with the amount of the solution).

Assessment of Taste

A drinking test was conducted by a panel of five trained assessors.

Storage Test (Accelerated Test)

Each prepared beverage was stored at 55° C. for 2 weeks, and a change in the color tone of the beverage during its storage was visually graded by the panel of five trained assessors in accordance with the following standards. Further, a measurement was conducted for non-polymer catechins.

A: Unchanged, B: slightly changed, C: changed, D: significantly changed.

Example 1

A commercial purified product (100 g) of green tea extract ("POLYPHENONE HG", Mitsui Norin Co., Ltd.) was dispersed in 90.0 wt % ethanol (900 g), followed by aging for 30 minutes. The dispersion was filtered through No. 2 filter paper and then through filter paper of 0.2 μm pore size. Water (200 mL) was added to the filtrate, followed by concentration under reduced pressure to obtain a purified product. Non-polymer catechins (A) in the thus-obtained purified product was 15.2 wt %, and the percentage of non-polymer catechin gallates (B) was 58.1 wt %. An aliquot (75.0 g) of the thus-obtained non-polymer catechin composition was placed in a stainless steel vessel, the total amount was brought to 1,000 g with deionized water, and then, a 5 wt % aqueous solution of sodium hydrogencarbonate (3.0 g) was added to adjust its pH to 5.5. Under stirring conditions of 22° C. and 150 r/min, a solution of "KIKKOMAN TANNASE KTFH" (Industrial Grade, 500 U/g minimum; 0.27 g (2.4% based on the non-polymer catechins) dissolved in deionized water (1.07 g) was then added. Upon elapsed time of 55 minutes at which the pH had dropped to 4.24, the enzyme reaction was terminated. The stainless steel vessel was next immersed in a hot bath of 95° C., and was held at 90° C. for 10 minutes to completely inactivate the enzyme activity. After the stainless steel vessel was next cooled to 25° C., concentration processing was conducted. The non-polymer catechins in the purified product of green tea extract obtained after the tannase treatment amounted to 15.0 wt %. An aliquot (5.3 g) of the purified product of green tea extract, an aliquot (2.2 g) of the concentrate of the green tea extract and anhydrous crystalline fructose (36.6 g) were dissolved in water. Erythritol (7.5 g), L-ascorbic acid (0.5 g) and a green tea flavor were then added to adjust the pH to 4.0, and the total amount was brought to 1,000 g. Subsequent to mixing, the green tea beverage was subjected to UHT sterilization, and was then filled in a PET bottle. Non-polymer catechins in the packaged green tea beverage amounted to 0.134 wt %, the percentage of non-epicatechins was 16.2 wt %, the percentage of non-polymer gallates was 50.3 wt %, and the caffeine/non-polymer catechins ratio was 0.104. Its composition and the assessment results of its taste are shown in Table 1.

Examples 2-11

The packaged green tea beverages shown in Table 1 were produced. Their compositions and their taste assessment and storage test results are shown in Table 1.

Comparative Example 1

A packaged green tea extract was produced in a similar manner as in Example 1 except that the pH of the beverage was adjusted to 6.0. Its composition and its taste assessment and storage test results are shown in Table 1.

TABLE 1

|  |  | Ex. 1 | Ex. 2 | Ex. 3 | Ex. 4 | Ex. 5 | Ex. 6 |
|---|---|---|---|---|---|---|---|
| Formulation | Purified product of green tea extract containing non-polymer catechins (wt %) | 0.53 | 0.53 | 0.53 | 0.53 | 0.53 | 0.53 |
|  | Concentrate of green tea extract (wt %) | 0.22 | 0.22 | 0.22 | 0.22 | 0.22 | 0.22 |
|  | (E) Fructose (wt %) | 3.66 | 3.66 | 3.66 | 3.66 | 3.66 | — |
|  | (E) Glucose (wt %) | — | — | — | — | — | 3.66 |
|  | (E) Fructoglucose syrup (wt %) | — | — | — | — | — | — |
|  | (E) Granulated sugar (wt %) | — | — | — | — | — | — |
|  | Erythritol (wt %) | 0.75 | 0.75 | 0.75 | — | — | 0.75 |
|  | Citric acid (wt %) | — | — | 0.3 | — | — | — |
|  | Ascorbic acid (wt %) | 0.05 | 0.05 | 0.05 | 0.05 | 0.05 | 0.05 |
|  | Sodium ascorbate (wt %) | — | — | — | — | — | — |
|  | Green tea flavor (wt %) | 0.1 | 0.1 | 0.1 | 0.1 | 0.1 | 0.1 |
|  | 5% aqueous solution of sodium hydrogencarbonate (wt %) | — | 0.49 | — | — | 0.49 | — |
|  | Deionized water (wt %) | Balance | Balance | Balance | Balance | Balance | Balance |
|  | Total amount | 100 | 100 | 100 | 100 | 100 | 100 |
| After sterilization | (A) Non-polymer catechins (wt %) | 0.134 | 0.134 | 0.134 | 0.134 | 0.134 | 0.134 |
|  | (B) Percentage of non-epicatechin body (wt %) | 16.2 | 24.5 | 14.9 | 16.2 | 24.6 | 16.2 |
|  | (C) Percentage of gallate body (wt %) | 50.3 | 50.3 | 50.3 | 50.3 | 50.3 | 50.3 |
|  | (F) Caffeine/(A) | 0.104 | 0.104 | 0.104 | 0.104 | 0.104 | 0.104 |
|  | Bitterness[1)] | 1 | 1 | 1 | 1 | 1 | 2 |
|  | Sourness and sweetness[2)] | 1 | 1 | 2 | 1 | 1 | 2 |
|  | (D) pH | 4.03 | 5.04 | 2.78 | 4.03 | 5.01 | 4.08 |
| Color hue after storage (55° C., 2 weeks)[3)] |  | B | B | B | B | B | B |
| Non-polymer catechins after storage (55° C., 2 weeks) (wt %) |  | 0.121 | 0.102 | 0.109 | 0.115 | 0.100 | 0.124 |
| Calorific value (Kcal/240 mL) |  | 35 | 35 | 35 | 35 | 35 | 35 |

|  |  | Ex. 7 | Ex. 8 | Ex. 9 | Ex. 10 | Ex. 11 | Comp. Ex. 1 |
|---|---|---|---|---|---|---|---|
| Formulation | Purified product of green tea extract containing non-polymer catechins (wt %) | 0.53 | 0.53 | 0.59 | 0.53 | 0.53 | 0.53 |
|  | Concentrate of green tea extract (wt %) | 0.22 | 0.22 | 0.22 | 0.22 | 0.22 | 0.22 |
|  | (E) Fructose (wt %) | — | — | — | — | — | 3.66 |
|  | (E) Glucose (wt %) | 3.66 | 3.66 | — | — | — | — |
|  | (E) Fructoglucose syrup (wt %) | — | — | 4.88 | — | — | — |
|  | (E) Granulated sugar (wt %) | — | — | — | 3.66 | 3.66 | — |
|  | Erythritol (wt %) | 0.75 | — | — | — | — | — |

TABLE 1-continued

| | | | | | | | |
|---|---|---|---|---|---|---|---|
| | Citric acid (wt %) | — | — | — | — | — | — |
| | Ascorbic acid (wt %) | 0.05 | 0.05 | 0.05 | 0.05 | 0.05 | — |
| | Sodium ascorbate (wt %) | — | — | — | — | — | 0.03 |
| | Green tea flavor (wt %) | 0.1 | 0.1 | 0.1 | 0.1 | 0.1 | 0.1 |
| | 5% aqueous solution of sodium hydrogencarbonate (wt %) | 0.49 | — | — | — | 0.49 | 0.15 |
| | Deionized water (wt %) | Balance | Balance | Balance | Balance | Balance | Balance |
| | Total amount | 100 | 100 | 100 | 100 | 100 | 100 |
| After sterilization | (A) Non-polymer catechins (wt %) | 0.134 | 0.134 | 0.134 | 0.134 | 0.134 | 0.134 |
| | (B) Percentage of non-epicatechin body (wt %) | 24.1 | 16.2 | 16.2 | 16.2 | 24.3 | 42.1 |
| | (C) Percentage of gallate body (wt %) | 50.3 | 50.3 | 50.3 | 50.3 | 50.3 | 50.3 |
| | (F) Caffeine/(A) | 0.104 | 0.104 | 0.104 | 0.104 | 0.104 | 0.104 |
| | Bitterness[1] | 2 | 2 | 2 | 2 | 2 | 3 |
| | Sourness and sweetness[2] | 2 | 2 | 1 | 1 | 1 | 3 |
| | (D) pH | 5.02 | 4.03 | 4.01 | 4.07 | 5.04 | 6.01 |
| Color hue after storage (55° C., 2 weeks)[3] | | B | B | B | B | B | D |
| Non-polymer catechins after storage (55° C., 2 weeks) (wt %) | | 0.119 | 0.126 | 0.124 | 0.125 | 0.122 | 0.078 |
| Calorific value (Kcal/240 mL) | | 35 | 35 | 35 | 35 | 35 | 35 |

[1]5-stage assessment of bitterness, 1: no bitterness, 2: substantially decreased bitterness, 3: decreased bitterness, 4: slightly decreased bitterness, 5: usual bitterness.
[2]5-stage assessment of sourness and sweetness, 1: extremely well-balanced sourness and sweetness, 2: well-balanced sourness and sweetness, 3: balanced sourness and sweetness, 4: non-balanced sourness and sweetness, 5: bad-balanced sourness and sweetness.
[3]Color after storage, A: unchanged, B: slightly changed, C: changed, D: considerably changed.

From Table 1 it is evident that the packaged green tea according to the present invention cannot only reduce astringency but also provide for adequate sweetness and sourness without impairment of the taste and is suited for long-term storage while containing a sweetener.

The invention claimed is:

1. A packaged green tea beverage, wherein
   (A) the packaged green tea beverage comprises from 0.08 to 0.5 wt % of non-polymer catechins,
   (B) a percentage of non-epicatechin body in the non-polymer catechins is from 5 to 25 wt %,
   (C) a percentage of gallate body in the non-polymer catechins is from 5 to 95 wt %,
   (D) pH is from 2.5 to 5.1,
   (E) the packaged green tea beverage comprises from 0.0001 to 20 wt % of at least one sweetener selected from fructose, glucose, sucrose, fructoglucose syrup and glucofructose syrup, and
   (F) caffeine,
   wherein said packaged green tea beverage has a content weight ratio [(F)/(A)] of (F) caffeine to (A) the non-polymer catechins is from 0.05 to 0.13, and
   wherein said packaged green tea beverage has a calorific value of less than 40 Kcal/240 mL.

2. The packaged green tea beverage according to claim 1, wherein said packaged green tea beverage comprises a mixture of a concentrate of a green tea extract and a purified product of a green tea extract.

3. The packaged green tea beverage according to claim 1, wherein (C) the percentage of the gallate body in the non-polymer catechins is from 5 to 50 wt %.

4. The packaged green tea beverage according to claim 1, further comprising a sugar alcohol.

5. The packaged green tea beverage according to claim 1, further comprising an artificial sweetener.

6. The packaged green tea beverage according to claim 1, further comprising at least one sour seasoning selected from ascorbic acid, citric acid, gluconic acid, succinic acid, tartaric acid, lactic acid, fumaric acid, phosphoric acid, malic acid, and salts thereof.

7. The packaged green tea beverage according to claim 1, further comprising at least one vitamin B selected from a Vitamin B complex selected from inositol, thiamine hydrochloride, thiamine nitrate, riboflavin, riboflavin 5'-phosphate sodium, niacin, nicotinamide, calcium pantothenate, pyridoxy hydrochloride and cyanocobalamin, folic acid, and biotin in an amount of at least 10 wt % of its daily requirement per package.

8. The packaged green tea beverage according to claim 1, wherein the sweetness of the beverage is felt at a level of 2 or more per 1 of the sweetness of sucrose.

9. The packaged green tea beverage according to claim 1, which is a non-carbonated beverage.

10. The packaged green tea beverage according to claim 1, which is a carbonated beverage.

11. The packaged green tea beverage according to claim 1, which has a calorific value ranging from 2 to 35 kcal/240 mL.

12. The packaged green tea beverage according to claim 1, which has a calorific value ranging from 3 to 30 kcal/240 mL.

13. The packaged green tea beverage according to claim 1, wherein (E) the packaged green tea beverage comprises from 0.0001 to 4.88 wt % of at least one sweetener selected from fructose, glucose, sucrose, fructoglucose syrup and glucofructose syrup.

14. The packaged green tea beverage according to claim 1, wherein (E) the packaged green tea beverage comprises from 0.01 to 4.88 wt % of at least one sweetener selected from fructose, glucose, sucrose, fructoglucose syrup and glucofructose syrup.

* * * * *